United States Patent
Yamada et al.

(10) Patent No.: US 6,444,727 B1
(45) Date of Patent: Sep. 3, 2002

(54) MODIFIED CARBON BLACK, PROCESS FOR PRODUCING THE MODIFIED CARBON BLACK, RUBBER COMPOSITION AND PNEUMATIC TIRE

(75) Inventors: Hiroshi Yamada, Tokyo; Tatsuhiko Ihara, Hiroshima-ken, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/670,716

(22) Filed: Sep. 28, 2000

(30) Foreign Application Priority Data

Oct. 1, 1999 (JP) ............................................ 11-281446

(51) Int. Cl.$^7$ .............................. C08K 9/06; C08K 3/04
(52) U.S. Cl. ....................... 523/215; 524/495; 524/496; 428/405
(58) Field of Search .......................... 523/215; 524/495, 524/496; 428/405

(56) References Cited

U.S. PATENT DOCUMENTS 4,820,751 A  *  4/1989  Takeshita et al.
6,090,880 A  *  7/2000  Zimmer et al.
6,211,279 B1 *  4/2001  Mahmud et al.

FOREIGN PATENT DOCUMENTS

| EP | 0 829 511 A1 | 3/1998 |
| WO | WO 98 13418 A1 | 4/1998 |
| WO | WO 98 45361 A1 | 10/1998 |

* cited by examiner

*Primary Examiner*—Tae H. Yoon
(74) *Attorney, Agent, or Firm*—Sughrue Mion, PLLC

(57) ABSTRACT

A rubber composition which comprises a rubber component comprising at least one rubber selected from natural rubber and synthetic diene rubbers and, per 100 parts by weight of the rubber component, 30 to 200 parts by weight of a modified carbon black having at a surface thereof an Si—O—C structure or an Si—C structure in which the carbon atom bonded directly to the Si atom is an aromatic carbon atom, and a pneumatic tire prepared by using the rubber composition. The modified carbon black can be obtained by bringing carbon black into contact with a silicon compound, such as a compound represented by a general formula: $(R^1O)_m SiR^2_{4-m}$ in a gas phase (in the formula, $R^1$ represents an alkyl group having 1 to 3 carbon atoms, $R^2$ represents an alkyl group having 1 to 3 carbon atoms or phenyl group and m represents an integer of 2 to 4).

The rubber composition exhibits hysteresis loss increased selectively at a high temperature region. The modified carbon black can be advantageously used in the rubber composition. The pneumatic tire in which the rubber composition is used for a tread rubber is advantageously used as a high performance tire exhibiting a remarkably improved gripping property.

11 Claims, 1 Drawing Sheet

MODIFIED CARBON BLACK, PROCESS FOR PRODUCING THE MODIFIED CARBON BLACK, RUBBER COMPOSITION AND PNEUMATIC TIRE

BACKGROUND OF THE INVENTION

1. Field of the Invention

The present invention relates to a modified carbon black, a process for producing the modified carbon black, a rubber composition and a pneumatic tire. More particularly, the present invention relates to a novel carbon black modified at the surface and a rubber composition and a pneumatic tire comprised of the modified carbon black and exhibit a remarkably improved gripping property.

2. Description of the Related Arts

As the automobile industry makes progress, automobiles are having higher power and exhibiting higher performances. At the same time, safety is considered more important and more improvement in the gripping property of a tire is required.

Heretofore, as the method for improving the gripping property of a tire, it is known that carbon black having a relatively large specific surface area such as an SAF black can be used for increasing hysteresis loss of a tread rubber. It is also known that, in combination with the above carbon black, a large amount of an oil having a high content of aromatic components can be used or a styrene-butadiene copolymer rubber containing a relatively large amount of bound styrene can be used. However, the use of carbon black having a large specific surface area causes a poor dispersion of the carbon black into rubber. The use of an increased amount of oil or carbon black to improve the gripping property causes a problem in that the surface of a tread becomes rough after being abraded.

In Japanese Patent Application Laid-Open No. Heisei 7(1995)-118452, a tread rubber composition comprising a silylating agent to improve gripping property on a frozen road surface is described. However, when a silylating agent is simply added to a rubber composition, unreacted silylating agent in the rubber composition adversely affects physical properties of the vulcanized rubber composition such as fracture resistance, and improvement in the gripping property is insufficient.

SUMMARY OF THE INVENTION

The present invention has been made to overcome the limitation in the conventional technology described above and has an object of providing a rubber composition exhibiting remarkably improved high hysteresis loss property, a modified carbon black advantageously used for the rubber composition and a process for producing the modified carbon black. The present invention has another object of providing a pneumatic tire which exhibits a remarkably improved gripping property due to the above rubber composition used for a tread rubber.

As the result of extensive studies by the present inventors to overcome the above problems with an attention focussed on carbon black, it was found that a carbon black, in which chemically active sites containing an oxygen atom such as hydroxyl group at the surface are inactivated by the treatment with a specific compound to form a specific chemical structure at the surface, can be effectively used. The present invention has been completed based on this knowledge.

The present invention provides:

(1) A rubber composition which comprises a rubber component comprising at least one rubber selected from the group consisting of natural rubber and synthetic diene rubbers and, per 100 parts by weight of the rubber component, 30 to 200 parts by weight of a modified carbon black at its surface, an Si—O—C structure or an Si—C structure in which the carbon atom bonded directly to the Si atom is an aromatic carbon atom;

(2) A rubber composition which comprises a rubber component comprising at least one rubber selected from the group consisting of natural rubber and synthetic diene rubbers and, per 100 parts by weight of the rubber component, 30 to 200 parts by weight of a modified carbon black which obtained by bringing carbon black, in a gas phase, into contact with at least one compound selected from the group consisting of silicon compounds represented by the general formula (I):

$$(R^1O)_m SiR^2_{4-m} \qquad (I)$$

wherein $R^1$ represents an alkyl group having 1 to 3 carbon atoms, $R^2$ represents an alkyl group having 1 to 3 carbon atoms or a phenyl group and m represents an integer of 2 to 4;

(3) A rubber composition which comprises a rubber component comprising at least one rubber selected from the group consisting of natural rubber and synthetic diene rubbers and, per 100 parts by weight of the rubber component, 30 to 200 parts by weight of a modified carbon black which is obtained by bringing carbon black, in a gas phase, into contact with at least one compound selected from the group consisting of silicon compounds represented by general formula (II):

$$(R^3O)_n SiR^4_{4-n} \qquad (II)$$

wherein $R^3$ represents an alkyl group having 1 to 3 carbon atoms, $R^4$ represents an alkyl group having 1 to 3 carbon atoms, a phenyl group or phenoxy group, at least one of groups represented by $R^4$ being a phenyl group or a phenoxy group, and n represents an integer of 1 to 3;

(4) A pneumatic tire prepared by using a rubber composition described in any of (1) to (3); and (5) A process for producing a modified carbon black which comprises bringing carbon black into contact with at least one compound selected from the group consisting of silicon compounds represented by the above described general formula (I) and silicon compounds represented by the above described general formula (II) in a gas phase.

DESCRIPTION OF THE PREFERRED EMBODIMENTS

Figure 1:
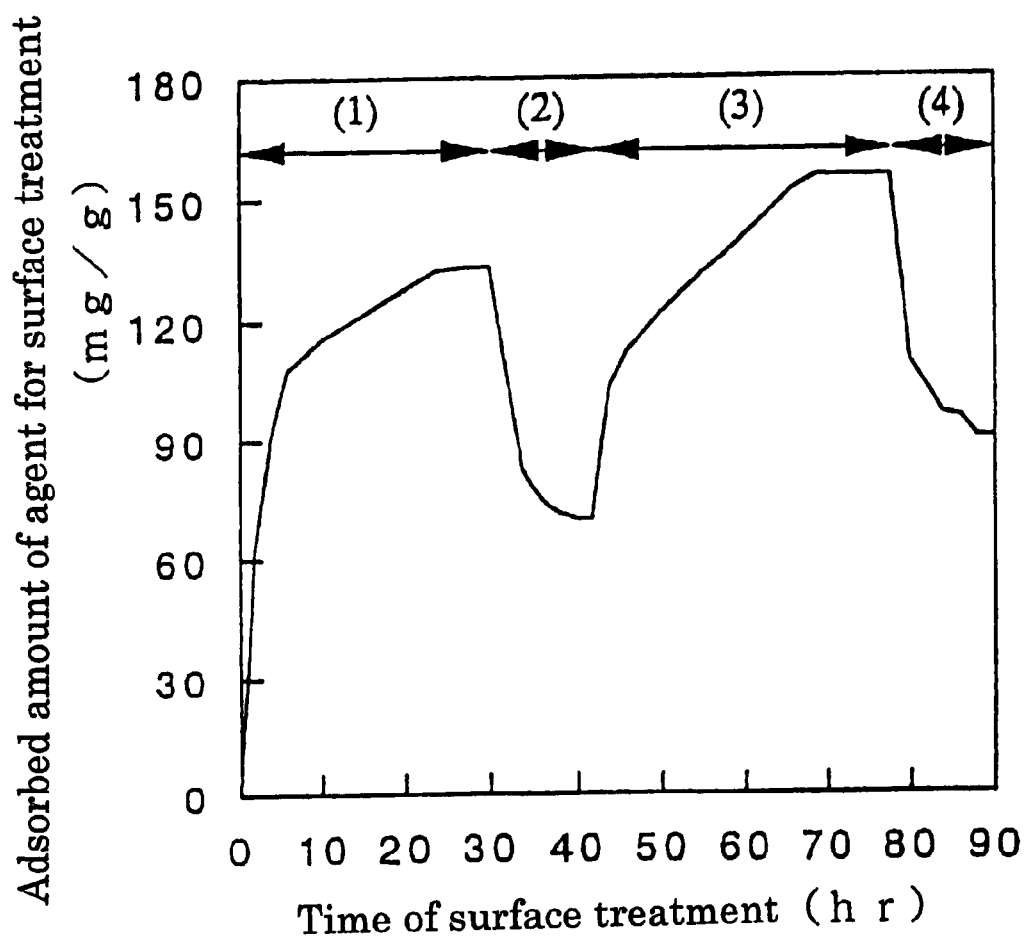
FIG. 1 shows a diagram exhibiting a relation between the time of the surface treatment and an adsorbed amount of an agent used in the surface treatment in the preparation of modified carbon black E used in Example 2.

As the rubber component in the present invention, natural rubber (NR) and synthetic diene rubbers can be used singly or in a combination of two or more. Examples of the synthetic diene rubber include synthetic polyisoprene rubbers (IR), polybutadiene rubbers (BR), styrene-butadiene rubbers (SBR), butyl rubbers (IIR) and ethylene-propylene terpolymers (EPDM).

In the present invention, carbon black used for the modification is not particularly limited. When the above rubber composition is used for a tire, carbon blacks of the SAF, ISAF, HAF and FEF grades are preferably used. Further, SAF is more preferable.

The modified carbon black in the present invention is a carbon black modified at its surface, i.e., a carbon black such as that described above having, at its surface, an Si—O—C structure or an Si—C structure in which the carbon atom bonded directly to an Si atom is an aromatic carbon atom. In the modified carbon black, functional groups such as hydroxyl group and carboxyl group at its surface are blocked with an inert structure derived from the above described silicon compound.

Examples of the process for producing a modified carbon black of the present invention include (1) a two-step process in which a carbon black is brought into contact with a silicon compound represented by general formula (I) shown above in the gas phase and then with a phenolic compound; and (2) a single step process in which carbon black is brought into contact with a silicon compound represented by general formula (II) in the gas phase.

In process (1), the silicon compound surely forms a chemical bond with a functional group at the surface of the carbon black since the silicon compound is brought into contact with the carbon black in the gas phase and the carbon black subjected only to the first step can improve the gripping property of the resulting rubber compound. Moreover, by bringing the obtained carbon black into contact with a phenolic compound in the second step, a phenoxy group is introduced into the surface of the carbon black. Therefore, the gripping property of the obtained rubber composition can be further improved.

In process (2), a carbon black is brought into contact with a silicon compound having a phenyl group or a phenoxy group in a single step. Therefore, the carbon black exhibiting the same effect as the carbon black obtained in accordance with process (1) can be obtained without the additional step of bringing the carbon black into contact with a phenolic compound.

In the above processes, a silicon compound or a phenolic compound can be brought into contact with the surface of the carbon black in the gas phase (the gas phase adsorption) in accordance with a conventional process such as the CVD process (the chemical vapor deposition process).

When used, the silicon compound represented by general formula (I) is used singly or in a combination of two or more. Among these silicon compounds, tetramethoxysilane, tetraethoxysilane, tetra-n-propoxysilane, tetra-isopropoxysilane and trimethoxymethylsilane are preferable. As the monovalent phenolic compound used in the second step, phenol is preferable. When necessary, the silicon compound represented by general formula (II) is used singly or in a combination of two or more. As the silicon compound represented by general formula (II), diphenyldiethoxy-silane, diphenyldimethoxysilane and triphenylethoxysilane are preferable.

In the modified carbon black of the present invention, the amount of the silicon compound bonded to a functional group at the surface of the carbon black can be controlled by irradiating the carbon black with a low temperature plasma in advance and suitably changing the amount of the functional groups containing oxygen at the surface of the carbon black while adjusting the condition of the irradiation. For example, the acidity at the surface of carbon black tends to decrease when the gas of the atmosphere during the irradiation is a hydrogen gas or a mixed gas of methane and hydrogen and tends to increase when the gas of the atmosphere during the irradiation is the water vapor ($H_2O$). The acidity of the surface of the carbon black can be obtained by the titration using an aqueous solution of sodium hydroxide.

The above process for producing a modified carbon black of the present invention can be applied independently of the surface activity of the carbon black. Therefore, the process can be satisfactorily applied also to a carbon black which is not subjected to the plasma treatment.

The introduction of functional groups by a treatment with a low temperature plasma can be conducted using a low temperature plasma as described in the specification of Japanese Patent Application Publication No. Heisei 5(1993)-18339 or a paper published in "Shikizai", Volume 60(6), Page 342, 1987.

As a power source for generating a plasma, a high frequency, microwave, direct current or alternating current power source can be used. As the type of discharge, glow discharge, corona discharge or discharge using a boxer charger by induction loading or by capacity loading can be used. The type of discharge or power source are not particularly limited.

As the gas of the atmosphere during the irradiation with plasma, one gas or a mixture of two or more gases selected from $H_2O$, oxygen, an air, carbon dioxide, carbon monoxide, hydrogen, nitrogen, argon and helium can be used. To efficiently introduce functional groups containing oxygen into the surface of carbon black, it is preferable that $H_2O$, oxygen or an air is used. To prevent ashing of carbon black during the irradiation with plasma, it is more preferable that $H_2O$ is used.

The pressure of the gas of the atmosphere is $10^{-2}$ to 5 Torr and preferably $10^{-2}$ to 3 Torr. When the pressure is greater than this range, the plasma becomes unstable and the amount of functional groups containing oxygen introduced into the surface of the carbon black may decrease.

The amount of the above silicon compound adsorbed to the modified carbon black can be obtained from the amount of ash which is obtained by completely burning the modified carbon black in an electric oven. In the present invention, it is preferable that the amount of ash obtained from the modified carbon black is 0.5 to 10% by weight and more preferably 0.5 to 8% by weight of the modified carbon black before being burned.

In the present invention, it is preferable that the amount of the modified carbon black used in the rubber composition is 30 to 200 parts by weight per 100 parts by weight of the rubber component from the standpoint of achieving the excellent abrasion resistance and the excellent gripping property simultaneously. To the rubber composition of the present invention, conventional carbon black and silica may further be added singly or in combination. In this case, it is preferable that the total amount of the modified carbon black, conventional carbon black and silica is 200 parts by weight or less per 100 parts by weight of the rubber composition. When the amount exceeds 200 parts by weight, there is a tendency that the rubber composition becomes harder and processability becomes inferior.

The rubber composition of the present invention may suitably comprise, where necessary, compounding ingredients generally used in the rubber industry such as silane coupling agents, softeners, antioxidants, vulcanizing agents and vulcanization accelerators in addition to the rubber component and the modified carbon black described above.

To summarize the advantages of the present invention, the rubber composition in which the modified carbon black of the present invention is used exhibits a remarkably improved gripping property without adverse effects on abrasion resistance. A tire in which this rubber composition is used for a tread can be advantageously used as a high performance tire since the gripping property in a high temperature region which corresponds to the condition during the use of the tire can be selectively improved. The pneumatic tire of the present invention can be used after the inside of the tire is filled with a gas such as the air and nitrogen to inflate the tire.

EXAMPLES

The present invention will be described more specifically with reference to examples in the following. However, the present invention is not limited to the examples.

The condition of the plasma treatment, the process for preparation of a modified carbon black and methods of various measurements are shown in the following.

The Condition of the Plasma Treatment

A rotary evaporator was modified and used as an apparatus for the plasma treatment. As an apparatus for generating a high frequency wave, AX-1000 manufactured by ADTEC Co., Ltd., generating a high frequency oscillation of 13.56 MHz, was used. As a matching apparatus, an automatic matching apparatus AM-1000S manufactured by ADTEC Co., Ltd. was used. A prescribed amount of carbon black which had been dried in advance under a reduced pressure at 60° C. for 24 hours or longer was placed in the apparatus for the plasma treatment and the system was evacuated to 1.3 Pa or lower. Then, a prescribed type of gas was passed through the reactor with a flow rate adjusted to a prescribed value. The carbon black was irradiated with the plasma in a prescribed condition while the apparatus was rotated. During this operation, the energy of the plasma given to the gas of the atmosphere was adjusted to 15 W to 30 W.

Preparation of a Modified Carbon Black

1. Treatment with tetraethoxysilane (TEOS) (the first step)

A dish containing 1 g of a carbon black of the SAF grade and a dish containing 10 ml of tetraethoxysilane (TEOS) were placed into a vacuum drying oven with an atmospheric temperature adjusted at 25° C. in advance. The pressure of the oven was reduced to 60 mmHg and the reaction between the carbon black and TEOS was allowed to proceed in the gas phase for a prescribed time. Then, the temperature was raised to 60° C. and the oven was left under a reduced pressure until the the excess of TEOS was removed and the decrease in the weight of the carbon black was not observed any more.

2. Treatment with Phenol (the second step)

After the process of the first step had been completed, a dish containing 3 g of phenol was placed in the vacuum drying oven in place of the dish containing TEOS. The pressure in the oven was reduced to the same pressure as that in the first step and the temperature in the oven was raised to 40° C. The reaction between the carbon black which had been treated with TEOS and phenol was allowed to proceed in the gas phase for a prescribed time. Then, the temperature was raised to 60° C. and the oven was left under a reduced pressure until the excess of phenol was removed and the decrease in the weight of the carbon black was not observed any more.

3. Treatment with Diphenyldiethoxysilane (the DPDES treatment)

A dish containing 1 g of a carbon black of the SAF grade and a dish containing 10 ml of diphenyldiethoxysilane (DPDES) were placed into a vacuum drying oven with an atmospheric temperature adjusted at 25° C. in advance. The pressure of the oven was reduced to 60 mmHg and the reaction between the carbon black and DPDES was allowed to proceed in the gas phase for 96 hours. Then, the temperature was raised to 60° C. and the oven was left under a reduced pressure until the excess of DPDES was removed and the decrease in the weight of the carbon black was not observed any more.

Various Methods of Measurements

1. Specific Surface Area by Nitrogen Adsorption ($N_2SA$)

The specific surface area by nitrogen adsorption was obtained in accordance with the method of ASTM D4820.

2. Iodine Absorption

The iodine absorption was obtained in accordance with the method of Japanese Industrial Standard K6221-1982 (Method A).

3. Hysteresis Loss [tan δ]

Using DYNAMIC SPECTROMETER manufactured by RHEOMETRICS Company, USA, tan δ was measured under a dynamic shear strain (the amplitude: 1.0%; the frequency: 15 Hz) at 30° C., 60° C. and 100° C.. The results are shown as indices using the result in Comparative Example 3 as the reference, which is set at 100. The greater the value, the greater the hysteresis loss and the better the gripping property.

Examples 1 to 3 and Comparative Example 1 to 3

In Table 1, the specific surface areas by nitrogen adsorption ($N_2SA$) and the iodine absorptions as the colloidal properties of carbon blacks A to F are shown. Carbon black F was subjected to the plasma treatment before being modified and other carbon blacks were used without the plasma treatment. Rubber compositions were prepared using these carbon blacks in accordance with the formulations shown in Table 2. The amounts of the components in the formulation are shown in parts by weight. tan δ was measured in accordance with the method described above. The results are shown in Table 2.

TABLE 1

| Carbon black | A | B | C | D | E | F |
|---|---|---|---|---|---|---|
| Treatment for modification | | | | | | |
| treatment with TEOS[1] | — | — | — | treated | treated | — |
| treatment with phenol | — | — | — | — | treated | — |
| treatment with DPDES[2] | — | — | — | — | — | treated |
| Colloidal properties | | | | | | |
| specific surface area by nitrogen adsorption | 126 | 130 | 175 | 150 | 137 | 139 |

TABLE 1-continued

| Carbon black | A | B | C | D | E | F |
|---|---|---|---|---|---|---|
| [N$_2$SA] (m$^2$/g) iodine absorption (mg/g) | 122 | 137 | 180 | 154 | 128 | 132 |

Notes:
[1)]Tetraethoxysilane
[2)]Diphenyldiethoxysilane
A: Manufactured by TOKAI CARBON Co., Ltd.; SIEST 7HM
B: Manufactured by CABOT Company; N110
C: A tentatively prepared carbon black (not treated)
D: Carbon black C treated with TEOS
E: Carbon black C treated with TEOS and then with phenol
F: Carbon black C treated with DPDES

TABLE 2

| Example | | | | 1 | 2 | 3 |
|---|---|---|---|---|---|---|
| Comparative Example | 1 | 2 | 3 | | | |
| Carbon black | A | B | C | D | E | F |
| SBR (styrene content: 35%) | 100 | 100 | 100 | 100 | 100 | 100 |
| Carbon black | 90 | 90 | 90 | 90 | 90 | 90 |
| Petroleum softener (aromatic oil) | 60 | 60 | 60 | 60 | 60 | 60 |
| Stearic acid | 1.0 | 1.0 | 1.0 | 1.0 | 1.0 | 1.0 |
| Antioxidant 6C[1)] | 1.0 | 1.0 | 1.0 | 1.0 | 1.0 | 1.0 |
| Zinc oxide | 3.0 | 3.0 | 3.0 | 3.0 | 3.0 | 3.0 |
| Vulcanization accelerator DPG[2)] | 0.3 | 0.3 | 0.3 | 0.3 | 0.3 | 0.3 |
| Vulcanization accelerator DM[3)] | 0.7 | 0.7 | 0.7 | 0.7 | 0.7 | 0.7 |
| Sulfur | 1.5 | 1.5 | 1.5 | 1.5 | 1.5 | 1.5 |
| Hysteresis loss property | | | | | | |
| tan δ (30° C.) | 91 | 93 | 100 | 95 | 93 | 93 |
| tan δ (60° C.) | 82 | 87 | 100 | 100 | 100 | 101 |
| tan δ (100° C.) | 79 | 87 | 100 | 103 | 110 | 107 |

Notes:
[1)]Antioxidant 6C: N-phenyl-N'-(1,3-dimethylbutyl)-p-phenylenediamine
[2)]Vulcanization accelerator DPG: diphenylguanidine
[3)]Vulcanization accelerator DM: dibenzothiazyl disulfide Notes:

The results shown in Table 2 can be described as follows.

When the results in Comparative Examples 1 to 3 in which a conventional carbon black was used are compared, it is shown that, although tan δ increased with the increase in the specific surface area (N$_2$SA), the same change was found at various temperatures and no selective increase in the hysteresis loss at higher temperatures was found.

In contrast, in Examples 1 to 3 in which a modified carbon black of the present invention was used, tan δ could be increased selectively at higher temperatures (60 to 100° C.) which correspond to the conditions during the use of a tire and the effect was excellent.

Since the rubber composition comprising the modified carbon black of the present invention could exhibit a selective increase in tan δ at higher temperatures which correspond to the condition during the use of a tire, the rubber composition was found to be suitable for high performance tires to which the excellent gripping property is required.

The process for preparing modified carbon black E used in Example 2 will be described more specifically in the following.

The modified carbon black was prepared by bringing carbon black in contact with TEOS (the first step) and phenol (the second step), successively, in accordance with the process for producing a modified carbon black described above. A carbon black of the SAF type was modified without being subjected to the plasma treatment. In the process of the modification, the weight of the carbon black was measured at a prescribed time interval. The relation between the adsorbed amount of the agent for the surface treatment obtained by the measurement and the time of the surface treatment is shown in FIG. 1. In the relation shown in FIG. 1, (1) the increase in the weight by the adsorption of TEOS, (2) the decrease in the weight by the removal of TEOS under the reduced pressure, (3) the increase in the weight by the adsorption of phenol and (4) the decrease in the weight by the removal of phenol under the reduced pressure were confirmed.

In the first step, the adsorption of TEOS reached an equilibrium in about 30 hours and the adsorbed amount at this time was about 135 mg per 1 g of the carbon black. When TEOS was removed at 60° C. under the reduced pressure, the system reached an equilibrium in about 12 hours and the adsorbed amount of TEOS at this time was about 70 mg per 1 g of the carbon black. Since this adsorbed amount did not change even when further removal of TEOS was attempted, the adsorption was confirmed to be a chemical adsorption.

In the second step, adsorption of phenol reached an equilibrium in about 36 hours. When phenol was removed at 60° C. under the reduced pressure, the system reached an equilibrium in about 12 hours and the adsorbed amount of phenol at this time was about 10 mg. Since this adsorbed amount did not change even when further removal of phenol was attempted, the adsorption was confirmed to be a chemical adsorption.

What is claimed is:

1. A rubber composition which comprises a rubber component comprising at least one rubber selected from the group consisting of natural rubber and synthetic diene rubbers and, per 100 parts by weight of the rubber component, 30 to 200 parts by weight of a modified carbon black having at a surface thereof an Si—O—C structure or an Si—C structure in which the carbon atom bonded directly to the Si atom is an aromatic carbon atom.

2. A rubber composition which comprises a rubber component comprising at least one rubber selected from the group consisting of natural rubber and synthetic diene rubbers and, per 100 parts by weight of the rubber component, 30 to 200 parts by weight of a modified carbon black which is obtained by bringing carbon black, in a gas phase, into contact with at least one compound selected from the group consisting of silicon compounds represented by the general formula (I), followed by bringing the carbon black into contact with at least one phenolic compound:

$$(R^1O)_m SiR^2{}_{4-m} \tag{I}$$

wherein $R^1$ represents an alkyl group having 1 to 3 carbon atoms, $R^2$ represents an alkyl group having 1 to 3 carbon atoms or a phenyl group and m represents an integer of 2 to 4.

3. A rubber composition according to claim 2, wherein the silicon compound represented by general formula (I) is tetramethoxysilane and/or tetraethoxysilane.

4. A rubber composition according to claim 2, wherein the phenolic compound is phenol.

5. A rubber composition which comprises a rubber component comprising at least one rubber selected from the group consisting of natural rubber and synthetic diene rubbers and, per 100 parts by weight of the rubber component, 30 to 200 parts by weight of a modified carbon black which is obtained by bringing carbon black, in a gas phase, into contact with at least one compound selected from the group consisting of silicon compounds represented by the general formula (II):

$$(R^3O)_n SiR^4{}_{4-n} \tag{II}$$

wherein $R^3$ represents an alkyl group having 1 to 3 carbon atoms, $R^4$ represents an alkyl group having 1 to 3 carbon atoms, a phenyl group or a phenoxy group, at least one of the groups represented by $R^4$ being a phenyl group or a phenoxy group, and n represents an integer of 1 to 3.

6. A rubber composition according to claim 5, wherein the silicon compounds represented by general formula (II) are diphenyldiethoxysilane, diphenyldimethoxysilane and triphenylethoxysilane.

7. A rubber composition according to claim 1, wherein the carbon black is subjected to a plasma treatment before being modified.

8. A pneumatic tire prepared by using a rubber composition described in claim 1.

9. A process for producing a modified carbon black which comprises bringing carbon black into contact with at least one compound selected from the group consisting of silicon compounds represented by general formula (I) and silicon compounds represented by general formula (II) in a gas phase, general formula (I) being:

$$(R^1O)_m SiR^2{}_{4-m} \tag{I}$$

wherein $R^1$ represents an alkyl group having 1 to 3 carbon atoms, $R^2$ represents an alkyl group having 1 to 3 carbon atoms or a phenyl group and m represents an integer of 2 to 4, and general formula (II) being:

$$(R^3O)_n SiR^4{}_{4-n} \tag{II}$$

wherein R3 represents an alkyl group having 1 to 3 carbon atoms, $R^4$ represents an alkyl group having 1 to 3 carbon atoms, a phenyl group or a phenoxy group, at least one of the groups represented by $R^4$ being a phenyl group or a phenoxy group, and n represents an integer of 1 to 3.

10. A process according to claim 9, wherein the carbon black is subjected to a plasma treatment before being brought into contact with the silicon compound.

11. A modified carbon black produced in accordance with a process described in claim 9.

* * * * *